(12) United States Patent
Das et al.

(10) Patent No.: US 7,190,909 B2
(45) Date of Patent: Mar. 13, 2007

(54) GENERATION AND DETECTION OF OPTICAL MAINTENANCE SIGNALS IN OPTICAL NETWORKS

(75) Inventors: Jayanta Das, Morganville, NJ (US); Ganesh Lakshminarayana, Plainsboro, NJ (US); Kuo-Ming Lee, Morganville, NJ (US); Roman Antosik, Colts Neck, NJ (US); Scott Kaminski, Highlands, NJ (US); Jithamithra Sarathy, Atlantic Highlands, NJ (US); Boris Stefanov, Gillette, NJ (US); Ronald Simprini, Red Bank, NJ (US); Bharat Dave, Howell, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 953 days.

(21) Appl. No.: 10/172,369

(22) Filed: Jun. 14, 2002

(65) Prior Publication Data

US 2003/0011836 A1    Jan. 16, 2003

Related U.S. Application Data

(63) Continuation-in-part of application No. 10/118,596, filed on Apr. 8, 2002, now abandoned.

(60) Provisional application No. 60/298,189, filed on Jun. 14, 2001.

(51) Int. Cl.
*H04B 10/00* (2006.01)
(52) U.S. Cl. .................................................... 398/202
(58) Field of Classification Search ............ 398/25–27, 398/202–214
See application file for complete search history.

(56) References Cited

U.S. PATENT DOCUMENTS 6,693,881 B1 *   2/2004   Huysmans et al. ........ 370/236.1

* cited by examiner

*Primary Examiner*—Agustin Bello
(74) *Attorney, Agent, or Firm*—Kaplan Gilman Gibson & Dernier LLP

(57) ABSTRACT

Method and apparatus are presented for the generation and detection of maintenance signals in an optical data network. The maintenance signals are such that they can be read both by high bit-rate and low bit-rate receivers. Detection of the maintenance signals occurs in two stages. In a low bit-rate first stage each nodal input port is sampled in a round robin fashion to detect the presence of a maintenance signal. In a high bit-rate second stage the maintenance signal is verified and read by a high speed receiver, along with other high bit-rate information transmitted with it. One second stage high speed receiver is shared among M input channels for cost and circuit efficiency.

5 Claims, 6 Drawing Sheets

GENERATION AND DETECTION OF OPTICAL MAINTENANCE SIGNALS IN OPTICAL NETWORKS

CROSS REFERENCE TO OTHER APPLICATIONS

This application claims the benefit of U.S. Provisional Patent Application Ser. No. 60/298,189 filed on Jun. 14, 2001. This application is a continuation-in-part of U.S. patent application Ser. No. 10/118,596, filed on Apr. 8, 2002 now abandoned.

TECHNICAL FIELD

This invention relates to optical communications, and in particular to a method of generation and detection of optical maintenance signals in an optical data network and apparatus to implement the same.

BACKGROUND OF THE INVENTION

All-optical format and bit rate transparent data networks generally do not need to terminate and read bits in the signals that they propagate. This allows a considerable savings, both financially and in terms of device complexity, relative to OEO networks with their complex OEO receivers. This effect is especially seen as regards high bit rate networks and traffic, where due to bit rate OEO dependence, dedicated high speed receivers are required. Besides client traffic, data networks also transmit and receive maintenance signals of various types. Advanced all-optical networks utilize "optical alphabets" to implement this signaling, and thus do not need to terminate bits and decode information encoded in them. Nonetheless, all-optical networks may still need to read information by terminating bits from non-client traffic, such as maintenance signals. This occurs when all-optical sub-networks or network nodes are used within larger OEO networks, or are desired to be compatible with such networks. In such contexts, it is inefficient to provide each all-optical network element with the full cadre of OEO receivers simply to decode maintenance signal traffic. What is needed is an efficient means of enabling optical data networks with the ability to generate and detect maintenance signals in bit encoded formats.

SUMMARY OF THE INVENTION

Method and apparatus are presented for the generation and detection of maintenance signals in an optical data network. The maintenance signals are such that they can be read both by high bit-rate and low bit-rate receivers. Detection of the maintenance signals occurs in two stages. In a low bit-rate first stage each nodal input port is sampled in a round robin fashion to detect the presence of a maintenance signal. In a high bit-rate second stage the maintenance signal is verified and read by a high speed receiver, along with other high bit-rate information transmitted with it. One second stage high speed receiver is shared among M input channels for cost and circuit efficiency.

DETAILED DESCRIPTION OF THE PREFERRED EMBODIMENTS

Figure 1:
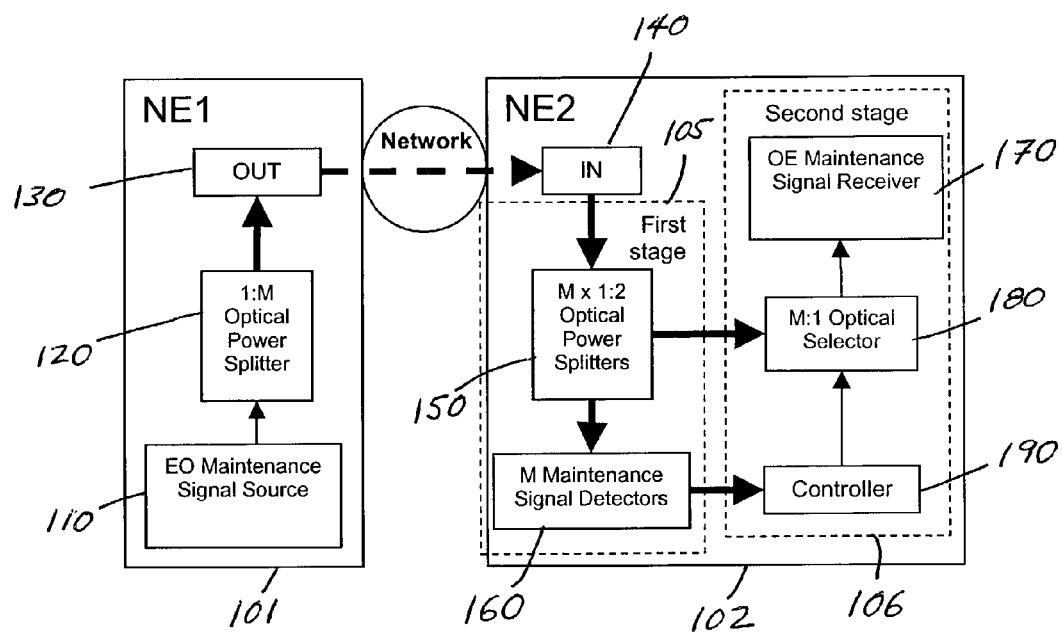
FIG. 1 depicts optical maintenance signaling according to the present invention.

Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and sub-processes). The invention is capable of other embodiments and of being practiced or being carried out in various ways. Also, it is to be understood that the phraseology and terminology used herein is for the purpose of description and should not be regarded as in any way limiting.

The idea of the present invention is a simple one. It seeks to implement optical maintenance signaling in all-optical data networks by transmitting a set of maintenance signals in a high bit-rate channel that can be decoded and read by low bit-rate (and thus low cost) receivers. The maintenance signals are decoded in two stages, the first using multiple low bit rate receivers, and the second sharing one or more high bit-rate receivers. Such a system and method increases spatial efficiency and lowers costs significantly.

FIG. 1 illustrates an efficient design for the generation and detection of high-speed optical maintenance signals. The signals must be bit-rate and format compatible with the client signals in non-transparent optical networks which implement wavelength conversion through OEO regeneration. In bit-rate and format transparent optical networks with wavelength conversion such compatibility is, of course, not required. With reference to FIG. 1, two network elements are depicted, NE1 101 and NE2 102. Within NE1 101, an EO Maintenance Signal Source 110 generates a high-speed optical maintenance signal. The signal is split by a 1:M Optical Power Splitter 120 to M output ports (OUT) 130. Each signal is independently inserted to a DWDM transmission channel under hardware or software control according to the detected condition. In restoration, for example, such detected condition is a loss of power (LOP) or an OSNR failure.

M maintenance signals from Network Element 1 (NE1) 101 are received by one or more NEs in the network. FIG. 1 depicts the exemplary case where all signals are received by NE2 102. According to the present invention, the OE receiver of the high-speed maintenance signal is a two-stage receiver. The first stage utilizes low speed inexpensive equipment locally at each input port, and the second stage utilizes a high speed shared detector servicing numerous input ports. In the first stage 105 each optical input port (IN) 140 has a dedicated Maintenance Signal Detector ("MSD") 160 that distinguishes between (1) a client signal received in the normal mode of operation and (2) maintenance signals received in failure or other modes of operation. Such MSD 160 is low in cost and small in size relative to higher speed OE maintenance signal receivers. The M detector inputs are split with M 1:2 Optical Power Splitters 150 so as to connect to the M:1 Optical Selector 180 which is under the control of the detectors 160. The M:1 Selector is directed to select the optical channel with the detected maintenance signal; then the shared high-speed OE Maintenance Signal Receiver 170 reads the data carried by that signal. If more than one maintenance signals are detected in the first stage, the Controller 190 controls the reading of their content one after another. The two-stage receiver is thus characterized by one expensive high-speed OE receiver for each group of M optical input ports, and inexpensive detectors provided for each input port. This design is more cost, power, and space effective than a design utilizing one high-speed EO transmitter and one high-speed OE receiver for each transmission channel.

Figure 2:
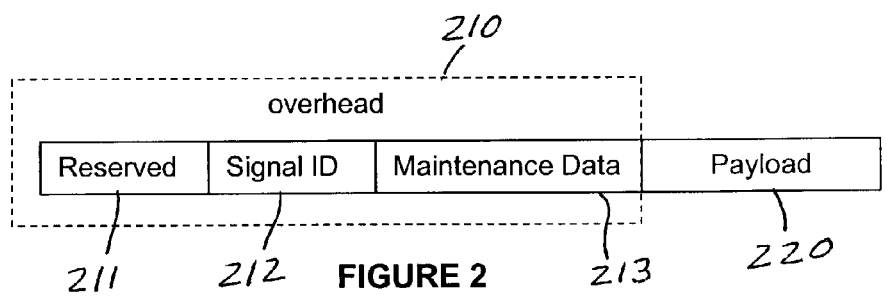
FIG. 2 depicts the protocol for a maintenance signal according to the present invention.

In general, a maintenance signal is a framed optical signal with overhead and payload sections. An example of such a framed signal is shown in FIG. 2. The frame comprises an overhead section 210 as well as a payload section 220. The overhead section further comprises a signal ID field 212 and a maintenance data field 213, whose functions will be described below, and a reserved field 211. Framing can be SONET or Gbit-Ethernet or any other framing protocol as is or may be known in the art.

As is seen in FIG. 2, the Maintenance Data and Signal ID are carried in the dedicated or undefined overhead bytes. The Signal ID allows for confirmation of the maintenance signal by the second stage high-speed Maintenance Signal Receiver ("MSR") and thus it can verify a detection made by the Maintenance Signal Detector ("MSD"). Maintenance Signal Bit-Patterns are carried in the Payload.

Figure 3:
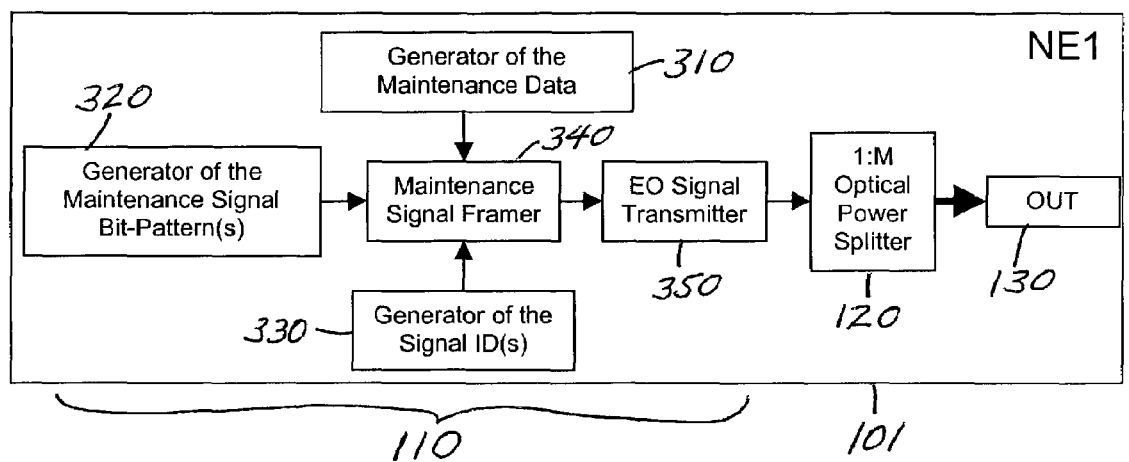
FIG. 3 depicts a maintenance signal transmitter according to the present invention.

The high-speed Maintenance Signal Source ("MSS"), 110 with reference to FIG. 1 inserts the Signal ID(s), Maintenance Data and Maintenance Signal Bit-Pattern(s) as shown in FIG. 3, which is a more detailed depiction of the source node NE1 101 of FIG. 1, which expands the MSS into its four components.

The MSS 110 (FIG. 1), generates one or more Maintenance Signals, each with a unique Maintenance Signal Bit-Pattern and Signal ID.

Figure 4:
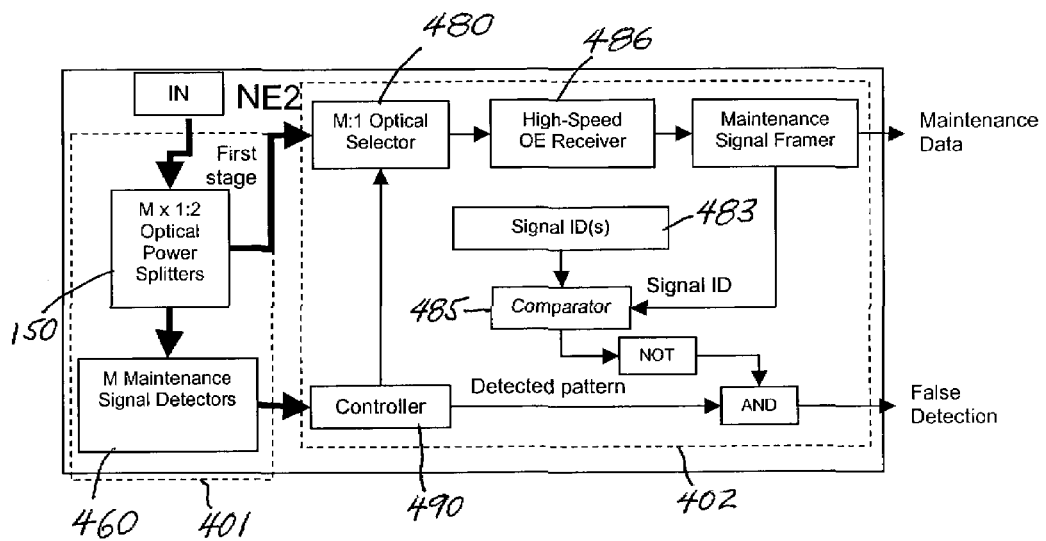
FIG. 4 depicts a maintenance signal receiver according to the present invention.

The Maintenance Signal Receiver is depicted in FIG. 4. It detects and reads maintenance signals. It is designed as a two-stage receiver. In the first stage 401 the per-port Maintenance Signal Detectors 460 detect the high-speed Maintenance Signals and control the M:1 Optical Selector 480. In the second stage 402 the Comparator 485 verifies the validity of the Signal ID(s) 483 read from the channel where the maintenance signal was detected which was selected by the Selector 480.

According to the present invention, lower-speed OE receivers can be used to detect high-speed maintenance signals. A lower-speed OE receiver detects a high-speed maintenance signal by detecting a specific bit pattern inserted into its payload by the Maintenance Signal Source (110 in FIG. 1).

The critical feature of such an implementation is the lower cost of the lower-speed OE receivers. To be detected by an N times slower OE receiver (i.e. a receiver operating at (1/N)*CLK where CLK is the bit-rate of the high speed maintenance signal), the high-speed Maintenance Signal Source 110 inserts blocks of N 1s and N 0s to the maintenance signal payload, in what might be termed a type of reverse run length coding. For a bit pattern to be so encoded, each 1 and each 0 in the bit pattern are multiplied by N. The slower-speed OE receiver detects the high speed blocks of 1s and 0s as a bit pattern of lower-speed 1 and 0 bits. For example, one could generate the lower-speed bit pattern 1010 by inserting into the payload alternating blocks of N 1s and N 0s. To generate the lower-speed bit pattern 11001100 one inserts into the payload blocks of 2N 1s and 2N 0s. As N grows larger, and utilizing at least a one byte (at the lower speed) maintenance signal, it is unlikely that eight alternating blocks of N 1s and N 0s would appear in client data, making detection likely. However, a client signal with a payload matching that of a maintenance signal is in fact detected as that maintenance signal, which would be a false positive. Such detection controls the M:1 Optical Selector 480 to feed the detected signal to the second stage, where the Signal ID 483 is read by the High-speed OE Receiver 486. The false detection is discovered when the High-speed OE Receiver 486 reads an invalid Signal ID. In restoration the much slower read of the overhead would add an unacceptable restoration delay. To avoid that the system assumes no detection error (i.e., one caused by a false positive as described above) and triggers restoration without waiting for the confirmation with the Signal ID read. Triggering restoration by false detection of a "not failed" client signal is an acceptable tradeoff for the faster detection time as long as it does not happen to often. Later discovery of the false detection by the high-speed OE receiver affords the network a chance to reverse the unnecessary action.

Further detail of NE 1 101 is provided in FIG. 3, wherein the sub-components of EO Maintenance Signal Source 110 are depicted. A Generator of Maintenance Data 310 provides information to Maintenance Signal Framer 340, with bit patterns input from a Generator of Maintenance Bit Pattern 320. At the same time, an identifier is generated at Generator of Signal IDs 330. Upon the convergence of maintenance data, maintenance signal bit pattern and ID, Maintenance Signal Framer 340 passes the signal to EO Signal Transmitter 350 for transmission to 1:M Optical Power Splitter 120 and output 130 (also described above in respect to FIG. 1.

Figure 5:
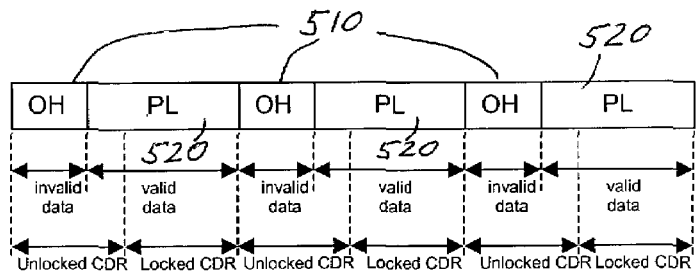
FIG. 5 depicts an exemplary received maintenance signal according to the present invention.

An exemplary maintenance signal received by the Maintenance Signal Detector 460 (FIG. 4) is depicted in FIG. 5. The overhead (OH) sections of the signal 510 are not blocks of 1s and 0s. They are thus not a valid lower-speed signal, and cannot be read by the low bit-rate detectors of the first stage. The payload (PL) sections of the signal 520 are made of blocks of 1s and 0s. They are thus valid lower-speed signals and can be read by the first stage MSDs 460 (FIG. 4). Clock and Data Recovery (CDR) of the lower-speed payload sections locks the recovered clock and facilitates reading the signal at lower speeds. However, the recovered clock may lose its lock on the clock rate of the payload sections when sampling the overhead sections of the signal.

Figure 6:
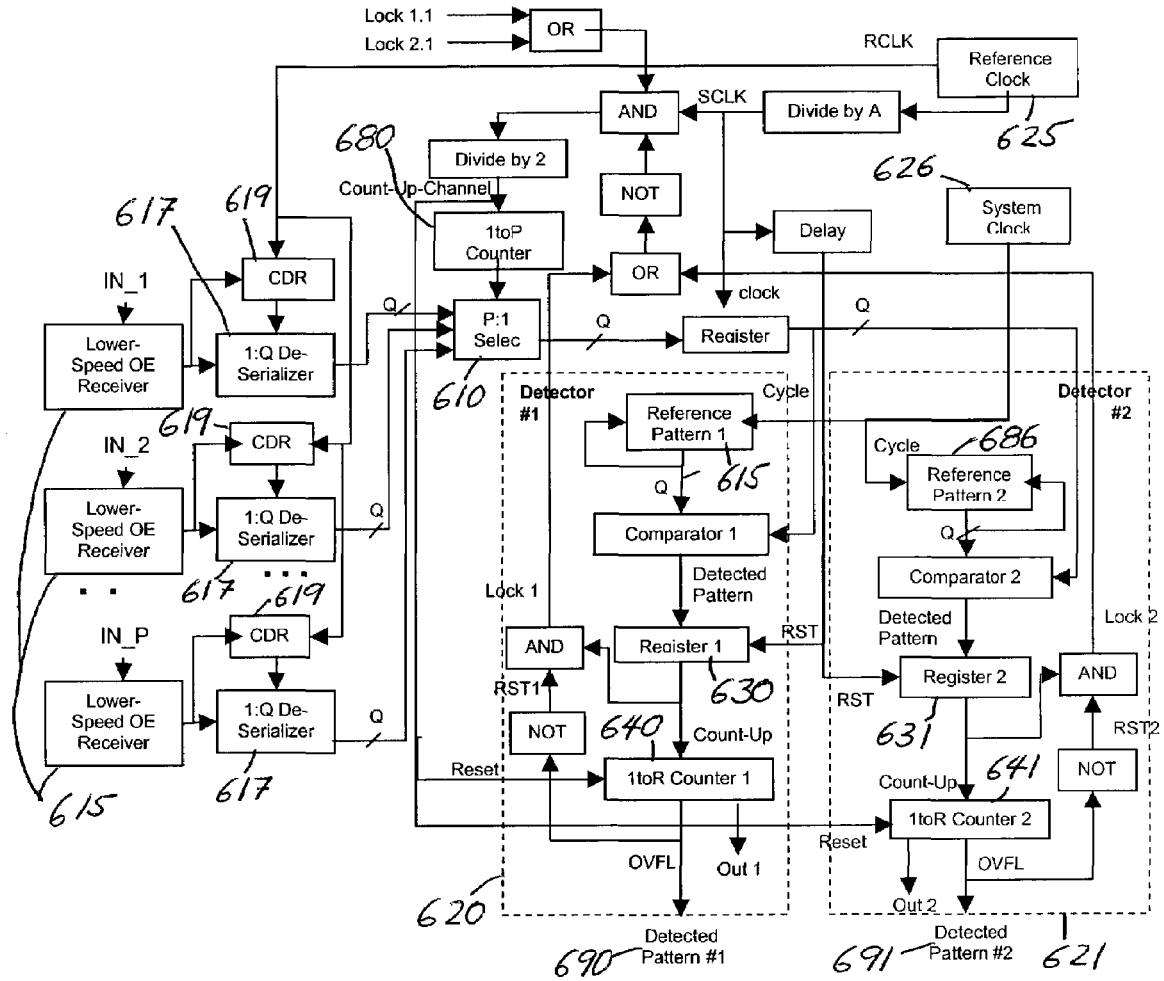
FIG. 6 depicts an electrical circuit for maintenance signal detection according to the present invention.

FIG. 6 depicts an exemplary block design of the Maintenance Signal Detectors (first stage) for P optical channels IN_1 through IN_P. Each input channel is sampled in round robin fashion by the P:1 Selector 610. The maintenance signal is sampled at random times. If the overhead is sampled no detection can be made and the next channel is selected. In a preferred embodiment, any associated detection delay is avoided by double sampling of each channel so as to detect at least one sample of the valid (at low bit-rate) payload pattern.

In the depicted exemplary circuit, P lower-speed OE Receivers 615 and corresponding 1:Q De-Serializers 617 share one common detector for each of two Maintenance Signal Bit-Patterns: Reference Pattern 1 and Reference Pattern 2. These are shown as Detector #1 620 and Detector #2 621, respectively. The P:1 Selector cycles selection of the input channels for pattern detection. Each channel sample is Q bits long. The sample size is determined by the 1:Q De-Serializer 617. The De-Serializer is timed from a standard Clock Data Recovery unit (CDR) 619. The CDR 619 has a Variable Crystal Oscillator (VCO) that adjusts its phase and frequency based on the phase shift between the rising edges of the input data and the rising edges of the oscillator. An unlocked CDR 619 switches the timing to the external reference clock (RCLK) 625. When a CDR 619 detects a lock it switches back to the recovered clock. Using the reference clock 625 shortens the time needed to lock the bursty data. The inserted Maintenance Signal Bit-Pattern is bursty valid data locking the CDR while the Client Signal is invalid data unlocking the CDR. A maintenance signal bit pattern such as 010101(01) has period of 2 and pattern such as 00110011 (0011) has period of 4. Detection of these patterns requires at least 4 lower-speed bits (blocks of high-speed non-transitions) in each sampled input channel (Q=4). Phase adjustment between Q bits long input samples and a reference Pattern (1 or 2) is achieved by cycling the reference patterns during each sample period. The number of cycles must be at least the longest period of the detected patterns plus one cycle for proper timing. Register 1 630 or Register 2 631 is set by detection of a match between the cycled (shifted) Pattern 1 or 2 with the input sample. The set of Registers 1 630 and 2 631 blocks the Count-Up-Channel signal to the 1:P Counter 680. This locks the current selection of the input channel for the next two samples. Registers 1 630 and 2 631 are reset by each new sample after a delay long enough so as to block a new channel selection if a pattern was detected in the previous sample. The 1:R Counters 1 640 and 2 641 count consecutive detections of the locked input channel. When R consecutive detections are made the 1:R Counter 1 640 or 2 641 resets Register 1 630 or 2 631 and thus unblocks the selection of the next input channel. The "Detected Pattern 1" 690 or "Detected Pattern 2" 691 signal controls the M:1 Optical Selector (not shown in FIG. 6, since used in the second stage, as described above) and interrupts the system with the detection of a maintenance signal. In restoration contexts, such interrupt triggers restoration of the failed service. The 1:R Counters 1 640 and 2 641 are reset each time a new input channel is selected.

Figure 7:
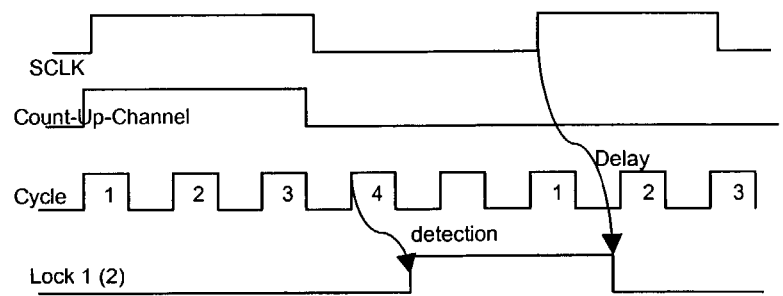
FIG. 7 illustrates the timing in an intermediate detection step for a detected longer pattern.

FIG. 7 shows the timing of the 4$^{th}$ cycle detection of the longer 0011(0011) pattern after less than R−1 consecutive detections of the pattern.

Figure 8:
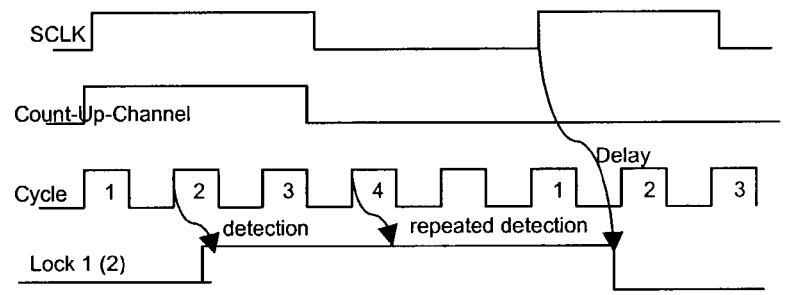
FIG. 8 illustrates the timing in an intermediate detection step for a detected shorter pattern.

FIG. 8 shows the timing of the 2$^{nd}$ cycle, repeated in the 4$^{th}$ cycle, detection of the shorter 01(01) pattern after less than R−1 consecutive detections of the pattern. The double detection is counted once.

Figure 9:
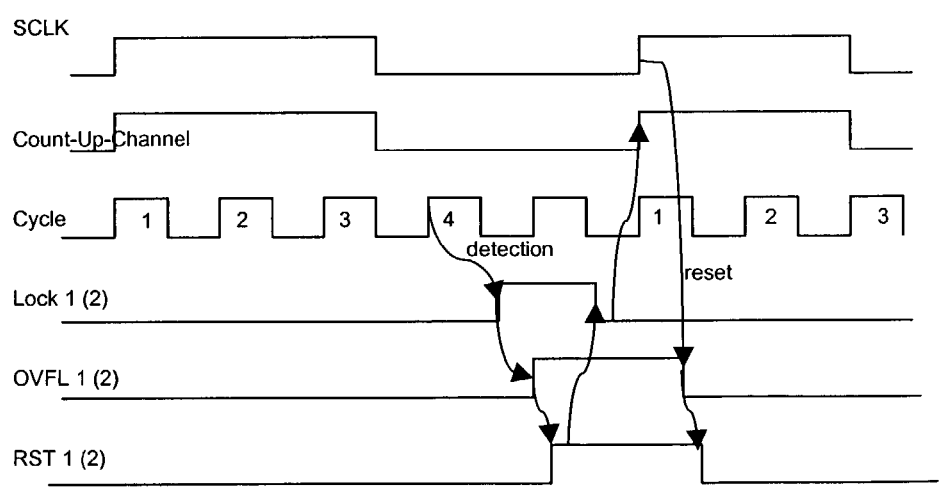
FIG. 9 illustrates the timing in a final detection step.

FIG. 9 shows the timing of the 4$^{th}$ cycle detection of the longer 0011(0011) pattern after R−1 consecutive detections of the pattern.

In FIGS. 7–9 the 1 to 4 numbering of the cycles reflects the fact that the longest pattern period is 4. The unmarked cycle is reserved for the proper timing of the control of selection of the next input channel.

Figure 10:
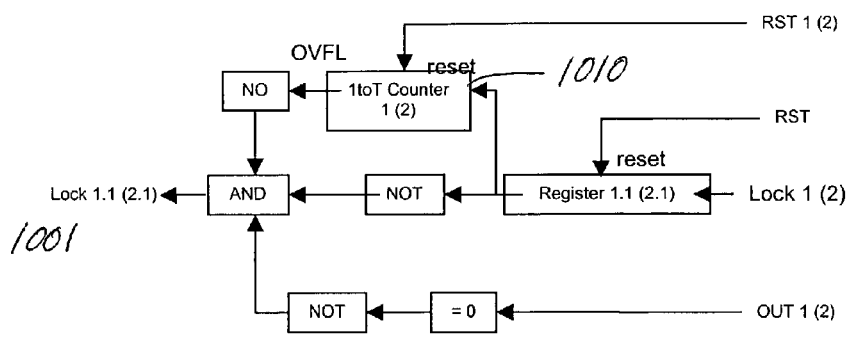
FIG. 10 depicts a pattern error filter according to the present invention.

As described, the detector of FIG. 6 requires R consecutive pattern detections and it is thus sensitive to pattern errors. FIG. 10 depicts a Pattern Error Filter used, in a preferred embodiment, to lock the detection of a current channel with the Lock 1.1 or Lock 2.1 signal 1001 when a pattern error is detected in the sampled maintenance signal. The Maintenance Signal Pattern Detector of FIG. 6 in combination with the Pattern Error Filter of FIG. 10 detects a maintenance signal by counting non-consecutive pattern detections.

The 1:T Counter 1 or 2 1010 counts pattern errors. The channel remains locked until there are R non-consecutive pattern detections of the same pattern or until T pattern errors are counted. These errors are generally caused by transmission noise, sampling of invalid overheads of the maintenance signals, and/or scrambling of the received maintenance signal.

When implemented, for example, in a 66 MHz FPGA, the Pattern Detector of FIG. 6 makes one pattern comparison each 15 microseconds. When detecting 10(10) and 1100 (1100) patterns one needs 4 cycles (comparisons) to detect a shifted pattern in the sampled input. One additional cycle is needed for proper timing of the round robin channel selection. Five 15 microsecond cycles are thus needed for detection of one input sample. The 75 microsecond long detection processes one sample from each frame of an OC192 maintenance signal. The 77.76 MHz reference clock RCLK to the OC192 De-Serializer is obtained by dividing the 622.08 MHz clock from the OC192 transmitter. The 77.76 MHz clock is divided by 8, to obtain the 9.72 MHz SCLK (system clock) 626. The SCLK 626 is divided by 2 to give the 4.86 MHz Count-Up-Channel for a 200 microsecond long selection of an input channel. Each selected channel is sampled twice with the SCLK clock. Each sample is compared 5 times with the shifted Reference Patterns 1 685 and 2 686. Successful detection of a maintenance signal is accomplished after the detection of 5 non-consecutive patterns with at most 5 pattern errors allowed in each detection. In such an exemplary implementation, the detection time of a maintenance signal is 1.25 milliseconds.

Figure 11:
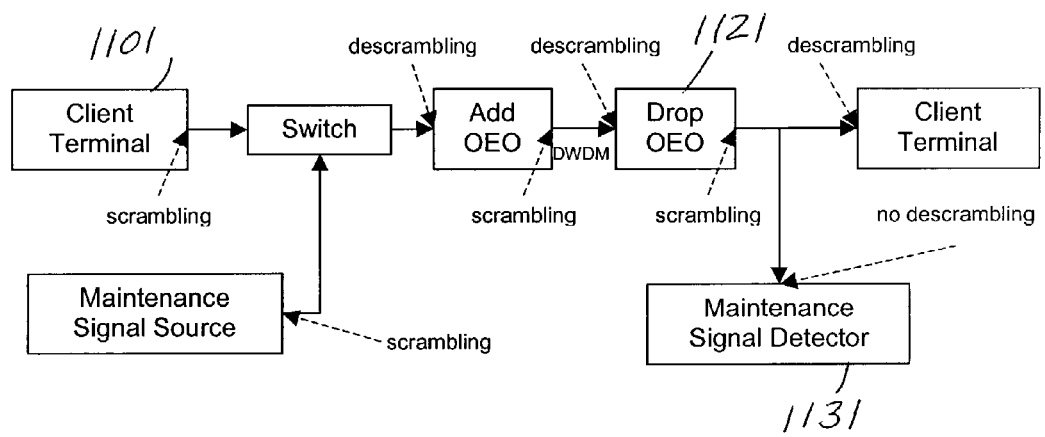
FIG. 11 illustrates the interplay of scrambling with client and maintenance signals according to the present invention.

Client signals are generally scrambled for transmission so as to balance the numbers of 1s and 0s in transmitted signals. This allows a 50% duty cycle for signals as required by DWDM transmission protocols. At the same time, the absence of long blocks of non-transitions in transmitted data assures clock recovery from the incoming data by allowing easy clock locking. The recovered clock is used for re-timing during OEO regeneration, or in all-optical 3R contexts, during AO3R. A depiction of scrambling in an exemplary data network is shown in FIG. 11.

With reference thereto, a Client Terminal 1101 scrambles a client signal prior to transmission. As well, a SONET Drop OEO regenerator 1121 scrambles regenerated output. Inasmuch as scrambling is high-speed, the lower-speed Maintenance Signal Detectors 1131 cannot de-scramble the scrambling. Scrambling adds zeros to the blocks of 1s and ones to the blocks of 0s in the Maintenance Signal Bit-Patterns. This addition is deterministic; i.e., blocks of 1s and 0s are augmented with the same number of scrambling bits. From the lower-speed OE receiver point of view, scrambling thus generates deterministic noise that decreases the power of every lower-speed "1" and increases the power of every lower-speed "0." The power difference between a detected lower-speed "1" and "0" is thus decreased. This decrease in the extinction ratio of the Maintenance Signal Bit-Pattern must be compensated by higher power in the receiver. The power penalty will depend on the type of scrambling, type of receiver and OSNR of the received signal. The Pattern Error Filter of FIG. 10 compensates for such a scrambling power penalty.

In non-transparent optical networks with OEO regenerators, a maintenance signal is not distinguished from a client signal by the OEO regenerators as long as their framing and speed (bit-rate) are the same. In transparent optical networks with no OEO regenerators, the maintenance signals would not be scrambled by the Maintenance Signal Source, thus eliminating the scrambling power penalty. However, the absence of scrambling impacts the performance of the all-optical clock recovery and retiming modules. It is thus a source of timing jitter of the maintenance signal. According to available data, it is estimated that blocks of 20 non-transitions increase jitter by 0.002p-pUI and blocks of 60 non-transitions increase jitter by 0.006p-pUI as compared to the common 0.15p-pUI jitter tolerance requirement. According to available data, in transparent all-optical networks where scrambling is not performed, the number of successive non-transitions should not be allowed to be longer than 100 in order to maintain the clock signal locking for all-optical clock recovery and re-timing.

While the above describes the preferred embodiments of the invention, various modifications or additions will be apparent to those of skill in the art. Such modifications and additions are intended to be covered by the following claims.

What is claimed:

1. A method of receiving maintenance signals at a data network node, comprising:
   a first stage of lower bit-rate per port detection; and
   a second stage of higher bit-rate centralized reception, the network node having a plurality of inputs, each of which is connected to a centralized selector, the method further comprising, upon detection of a maintenance signal at an input port in the first stage, selecting that port's signal and sending it to a shared high bit-rate receiver, and wherein the first stage detection comprises comparing a sampled input signal with one or more stored reference bit patterns, and wherein the second stage reception further comprises additionally verifying the maintenance signal and/or receiving additional maintenance information.

2. The method of claim 1, where the additional verifying is done by decoding a signal ID field sent with the maintenance signal, but unreadable in the first stage detection.

3. The method of claim 1, where the receiving of additional maintenance information is done by reading a maintenance data field sent with the maintenance signal, but unreadable in the first stage detection.

4. Apparatus for detection of maintenance signals in optical data networks, said maintenance signals comprising bit patterns, comprising:
   a first stage comprising:
      a dedicated low speed OE receiver for each input port;
   and a second stage comprising:
   a shared high speed OE receiver;
   a power splitter associated with each input port of said first stage, for transmitting a portion of the power to a low speed signal detector, and a portion to said second stage, and wherein said second stage further comprises an M:1 selector, where M is the number of input ports in the first stage, and a controller.

5. The apparatus of claim 4, where the first stage receiver further comprises a pattern error filter.

* * * * *